(12) United States Patent
Chou et al.

(10) Patent No.: US 7,240,369 B2
(45) Date of Patent: Jul. 3, 2007

(54) PLUG AND PLAY DEVICE AND ACCESS CONTROL METHOD THEREFOR

(75) Inventors: Wen-Hwa Chou, Taipei (TW); Yun-Kuo Lee, Hsinchu (TW)

(73) Assignee: Prolific Technology Inc., Taipei (TW)

( * ) Notice: Subject to any disclaimer, the term of this patent is extended or adjusted under 35 U.S.C. 154(b) by 841 days.

(21) Appl. No.: 10/425,612

(22) Filed: Apr. 30, 2003

(65) Prior Publication Data

US 2003/0208698 A1   Nov. 6, 2003

(30) Foreign Application Priority Data

May 1, 2002   (TW) ............................... 91109096 A

(51) Int. Cl.
*H04L 9/32* (2006.01)
*H04L 9/00* (2006.01)
*G06F 12/14* (2006.01)
*G06F 13/20* (2006.01)

(52) U.S. Cl. .................. 726/27; 713/169; 713/192; 713/194; 710/313

(58) Field of Classification Search ............. 713/169, 713/192, 194; 726/27
See application file for complete search history.

(56) References Cited

U.S. PATENT DOCUMENTS

| | | | | |
|---|---|---|---|---|
| 5,911,042 A * | 6/1999 | Kugue | ..................... | 726/19 |
| 6,088,802 A * | 7/2000 | Bialick et al. | ................ | 726/3 |
| 6,141,774 A * | 10/2000 | Mattheis | ..................... | 714/27 |
| 6,275,889 B1 * | 8/2001 | Saito | ..................... | 710/313 |
| 6,542,995 B2 * | 4/2003 | Heinrich et al. | ............. | 726/19 |
| 6,590,986 B1 * | 7/2003 | Fazio | ..................... | 381/314 |
| 6,745,266 B1 * | 6/2004 | Johnson et al. | ............. | 710/65 |
| 6,963,935 B1 * | 11/2005 | Young et al. | ............. | 710/29 |
| 7,038,665 B1 * | 5/2006 | Pandana | ..................... | 345/168 |
| 7,073,058 B2 * | 7/2006 | Lee | ..................... | 713/168 |
| 7,117,589 B2 * | 10/2006 | Chou et al. | ..................... | 29/832 |
| 7,178,167 B1 * | 2/2007 | Katoh et al. | ................ | 726/26 |

FOREIGN PATENT DOCUMENTS

CN   14006602 A   3/2003

* cited by examiner

*Primary Examiner*—Christopher Revak
*Assistant Examiner*—Kaveh Abrishamkar
(74) *Attorney, Agent, or Firm*—Rabin & Berdo PC

(57) ABSTRACT

A plug and play device and an access control method, in which the plug and play device includes an access control device and a main function device. When the plug and play device is connected to a host, the access control device is first connected to the host to execute an authorization procedure. The user is not authorized if the authentication procedure rejects the user. In this case, the plug and play device denies the host control. Conversely, the user is authorized if the authentication procedure approves the user. In this case, the plug and play device connects the main function device to the host and accepts control by the host. After the host loads a proper driver, it may control the plug and play device.

29 Claims, 2 Drawing Sheets

PLUG AND PLAY DEVICE AND ACCESS CONTROL METHOD THEREFOR

This application claims the benefit of Taiwan application Serial No. 091109096, filed on May 1, 2002.

BACKGROUND OF THE INVENTION

1. Field of the Invention

The invention relates to a plug and play device and a control method therefor, and more particularly to a plug and play device and an access control method therefor.

2. Description of the Related Art

The computer industry has recently experienced amazing developments. Interfaces such as USB and IEEE 1394 that support hot plug-in functions have been developed, and this feature is partly responsible for a great increase in their popularity. The plug and play device is explained as follows. After the plug and play device is connected to the host, the host may automatically search a proper driver and then install the driver. After installation of the driver is finished, the user may use this device, thus increasing the convenience of the hardware apparatus. It should be noted that the above-mentioned host might be a personal computer (PC) or a server.

The installation of a plug and play device is quite easy, but user privacy and data protection is lowered accordingly. For example, if a user lost a hard disk with a USB interface, any person who obtains the hard disk may install the hard disk in his/her computer and freely access the data stored in the hard disk. Therefore, the privacy of personal data no longer exists. Consequently, it is very important to create limitations in the plug and play device to prevent unauthorized users from accessing the device.

SUMMARY OF THE INVENTION

It is therefore an objective of the invention to provide an access control method for a plug and play device in order to enhance the protection of data and user privacy for the plug and play device.

The invention achieves the above-identified objective by providing a plug and play device and an access control method therefor. A description of the access control method follows.

The plug and play device includes an access control device and a main function device. After the plug and play device is connected to the host, an authorization procedure between the access control device and the host is first executed. The main function device is not connected to the host until authorization is approved. In another configuration, the plug and play device includes a selection device, an access control device, and a main function device. The selection device may be, for example, a hub. The access control device and the main function device are coupled to the selection device and are selectively coupled to the host through the selection device. After the plug and play device is connected to the host, the selection device first connects the access control device to the host so as to execute the authorization procedure. At this time, the main function device cannot be connected to the host through the selection device. After authorization is approved, the selection device further connects the main function device to the host so as to accept control by the host. In this particular application, the connection status between the host and the plug and play device can be changed by adjusting the voltage levels of some signals on the signal lines. That is, the connection between the host and the device can be opened or closed by adjusting the levels of the signal voltages.

Other objectives, features, and advantages of the invention will become apparent from the following detailed description of the preferred but non-limiting embodiments. The following description is made with reference to the accompanying drawings.

DETAILED DESCRIPTION OF THE INVENTION

In order to effectively prevent unauthorized users from accessing a plug and play device without changing the standard driver, the invention provides an access control method that when connected to the host, the plug and play device hides its identity and only informs the host that it is an access control device. Then, an authorization procedure (the user may input "username" or "password", for example) is executed between the host and the plug and play device. If the authentication procedure rejects the user, it means that the user is not authorized, and the plug and play device denies the host control. Conversely, if the authentication procedure approves the user, it means that the user is authorized, and the plug and play device will provide the host its real identity, for example, a hard disk compliant with the USB specification, and accept control by the host. After loading a proper driver, the host can control the plug and play device.

Figure 1:
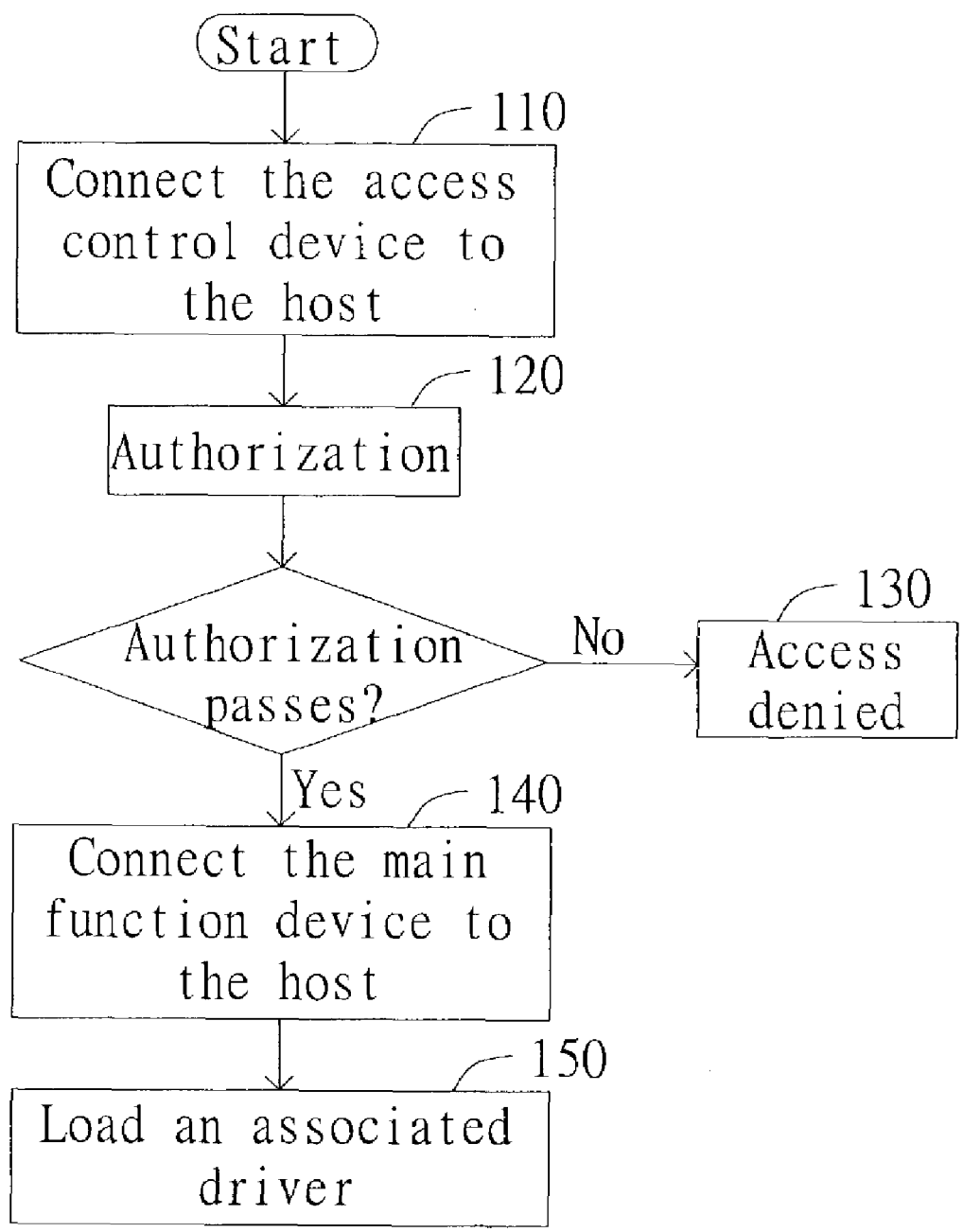
FIG. 1 is a flow chart showing an access control method for a plug and play device according to a preferred embodiment of the invention.

Please refer to FIG. 1, which is a flow chart showing an access control method for a plug and play device according to a preferred embodiment of the invention. There are several interface specifications such as PCI, USB, PCMCIA, Compact Flash, and IEEE 1394 which are designed for plug and play devices. For the sake of description, an access control method for such a plug and play device will be described using a hard disk with a USB interface as an example. After the hard disk is connected to a host, such as a personal computer, PDA (personal digital assistant), or server, the hard disk first outputs a signal to the host to indicate that it has been connected to the host. Then, the host communicates with the access control device, as indicated in step 110. Next, in step 120, an authorization procedure between the host and the access control device so as to prevent unauthorized users from accessing the data stored in the hard disk. There are several ways to execute the authorization procedure. For example, the user is requested to input a "username" or "password," the correctness of which will be identified. The user is not authorized if he or she inputs incorrect information. In this case, the authorization procedure does not approve the user and the hard disk denies the host control, as indicated in step 130. Conversely, the user is authorized if he or she inputs the correct information. In this case, the authentication procedure approves the user and a main function device, that is, a hard disk meeting the USB interface specification in this example, is connected to the host and accepts control by the host, as in step 140. After that, the host can load a driver suitable for the hard disk and can thus freely access the data stored in the hard disk, as shown in step 150.

Figure 2:
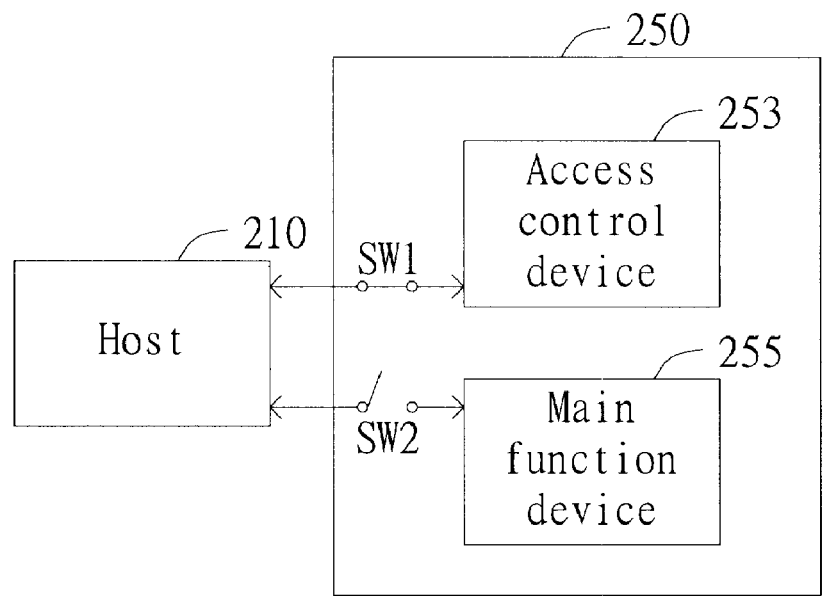
FIG. 2 is a block diagram showing a plug and play device with access control.

Next, please refer to FIG. 2, which is a block diagram showing a plug and play device with access control. The plug and play device 250 includes an access control device 253 and a main function device 255. If the plug and play device 250 is a hard disk with access control, the main function device 255 is used to implement all functions of the hard disk, and the access control device 253 is used to execute an authentication procedure with the host 210. When the plug and play device 250 is connected to the host 210, a switch SW1 is turned on (ON) and another switch SW2 is turned off (OFF). First, the authorization procedure between the access control device 253 and the host 210 is executed while the main function device 255 is not connected to the host 210. After the authorization procedure approves the user, the switch SW1 is turned off while the switch SW2 is turned on. At this time, the main function device 255 is connected to the host 210 and can accept control by the host 210. In practical applications, the connection status between the host and the plug and play device can be changed by adjusting voltage levels of some signals on signal lines. That is, as long as the levels of the signal voltages are adjusted so as to open and close the connection between the host and the device, it is not necessary to arrange the physical switches SW1 and SW2 between the plug and play device 250 and the host 210.

Figure 3:
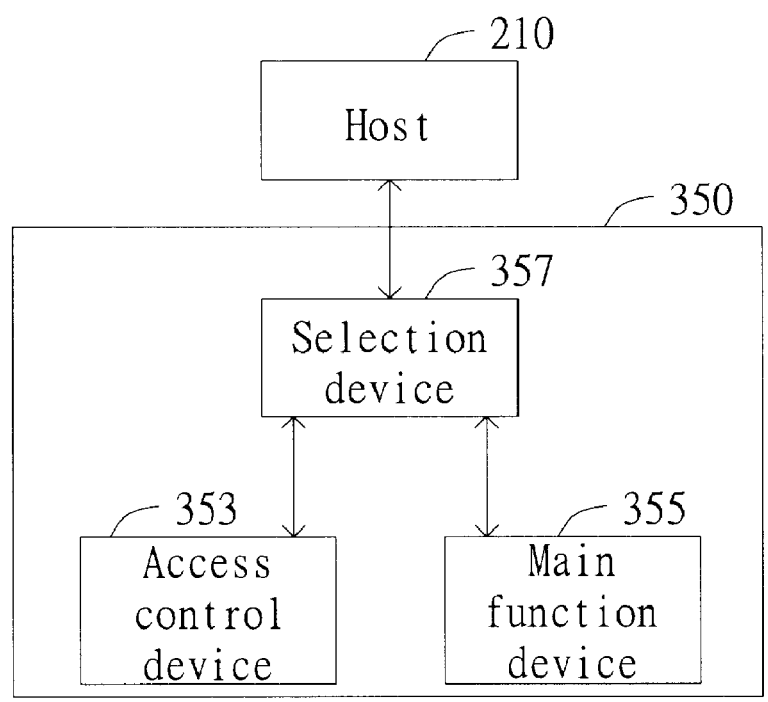
FIG. 3 is a block diagram showing another plug and play device with access control.

FIG. 3 is a block diagram showing another plug and play device with access control. The plug and play device 350 includes a selection device 357, an access control device 353, and a main function device 355. The selection device 357 may be, for example, a hub. The access control device 353 and the main function device 355 are coupled to the selection device 357 and are selectively coupled to the host 210 through the selection device 357. After the plug and play device 350 is coupled to the host 210, the selection device 357 connects the access control device 353 to the host 210 so as to execute the authorization procedure. At this time, the main function device 355 cannot connect with the host 210 through the selection device 357. After the authorization procedure approves the user, the selection device 357 connects the main function device 355 to the host 210 and accepts control by the host 210. In other words, the selection device 357 controls the connection status (ON or OFF) between the main function device 355 and the host 210 according to the result of the authorization procedure. If the authentication is successful, the main function device 355 and the host 210 are connected to accept control by the host 210. If the authentication fails, the connection status between the host 210 and the main function device 355 is OFF, and the main function device 355 does not accept the control by the host 210.

On the other hand, regarding a plug and play device with current standard specifications such as a hard disk compliant with the MSC (Mass Storage Class) specification, its associated device driver is typically built into the host's operation system. That is, if no access-controllable capability is adopted in the plug and play device with the standard specification, any user may connect the device to the host and control the device using the existing driver in the operation system. Thus, it is impossible to prevent unauthorized users from accessing the device. The invention is to add an authorization procedure for access control to the existing plug and play device, and the existing driver in the host does not need to be changed. Even though the plug and play device may operate by only using the existing driver in the operating system, the device still cannot be controlled if the authorization procedure fails. Consequently, after the authentication procedure is successful, the access control method of the invention is able to control the plug and play device, with the existing driver in the host without changing the existing driver.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An access control method for a plug and play device, wherein the plug and play device includes an access control device and a main function device, the access control method comprising the steps of:
   when the plug and play device is connected to a host, informing the host that the plug and play device includes only the access control device so as to hide the main function device and make the host unable to access the main function device;
   after the host is informed that the plug and play device includes only the access control device, coupling the access control device to the host and executing an authorization procedure between the access control device and the host;
   when the authorization procedure passes, informing the host that the plug and play device further includes the main function device and accepts control of the main function device by the host; and
   after the host is informed that the plug and play device further includes the main function device, enabling the main function device to be controlled by the host by loading a driver for the main function device at the host;
   wherein when the authorization procedure fails, the plug and play device rejects control by the host so as to hide the main function so that the host is unable to access the main device.

2. The method according to claim 1, wherein the authorization procedure comprises identifying a user name.

3. The method according to claim 1, wherein the authorization procedure comprises identifying a password.

4. The method according to claim 1, wherein the plug and play device meets at least an interface specification.

5. The method according to claim 4, wherein the at least an interface specification includes at least one of a USB interface specification, a PCI interface specification, a PCM-CIA interface specification, and a Compact Flash interface specification.

6. The method according to claim 1, wherein the host is a personal computer, a server, or a personal digital assistant.

7. An access control method for a plug and play device, wherein the plug and play device includes a selection device, an access control device and a main function device, the access control method comprising the steps of:
   when the plug and play device is connected to a host, firstly selecting the access control device by the selection device and coupling the access control device to the host through the selection device and the plug and play device informs the host that the plug and play device includes only the access control device so as to execute the authorization procedure and to hide the main function device, making the host unable to access the main function device;

after the host is informed that the plug and play device includes only the access control device, the host is coupled to the access control device, and an authorization procedure is executed between the host and the access control device so that the host is unable to be coupled to the main function device through the selection device;

when the authorization procedure passes, selecting the main function device by the selection device and coupling the main function device to the host through the selection device so as to accept control of the main function device by the host; and wherein when the authorization procedure fails, the selection device does not connect the main function device to the host and the plug and play device does not inform the host that the plug and play device further includes the main function device so as to hide the main function device so that the host is unable to access the main function device.

8. The method according to claim 7, wherein the authorization procedure comprises identifying a user name.

9. The method according to claim 7, wherein the authorization procedure comprises identifying a password.

10. The method according to claim 7, wherein the plug and play device meets at least an interface specification.

11. The method according to claim 10, wherein the at least an interface specification includes at least one of a USB interface specification, a PCI interface specification, a PCMCIA interface specification, and a Compact Flash interface specification.

12. The method according to claim 7, wherein the host is a personal computer, a server, or a personal digital assistant.

13. A plug and play device for being coupled to a host in order to transfer data, the plug and play device comprising:

a selection device for selectively making connection to the host;

an access control device, wherein when the selection device selects the access control device, the access control device is coupled to the host so as to execute an authorization procedure; and a main function device, selectively coupled to the host through the selection device;

wherein when the plug and play device is connected to a host, the selection device firstly selects the access control device to connect to the host and the plug and play device informs the host that the plug and play device includes only the access control device so as to execute the authorization procedure and to hide the main function device, making the host unable to access the main function device;

wherein when the authorization procedure passes, the selection device selects the main function device to connect to the host, the plug and play device informs the host that the plug and play device further includes the main function device and accepts control of the main function device by the host; and wherein when the authorization procedure fails, the selection does not connect the main function device to the host and the plug and play device does not inform the host that the plug and play device further includes the main function device so as to hide the main function device so that the host is unable to access the main function device.

14. The plug and play device according to claim 13, wherein the authorization procedure comprises identifying a user name.

15. The plug and play device according to claim 13, wherein the authorization procedure comprises identifying a password.

16. The plug and play device according to claim 13, wherein the plug and play device meets at least an interface specification.

17. The plug and play device according to claim 16, wherein the at least an interface specification includes at least one of a USB interface specification, a PCI interface specification, a PCMCIA interface specification, and a Compact Flash interface specification.

18. The plug and play device according to claim 13, wherein the host is a personal computer, a server, or a personal digital assistant.

19. The plug and play device according to claim 13, wherein the selection device comprises:

a first switch for selectively coupling the access control device to the host; and a second switch for selectively coupling the main function device to the host;

wherein when the plug and play device is connected to the host, the first switch couples the access control device to the host and the second switch does not couple the main function device to the host so as to hide the main function device and make the host being unable to access the main function device.

20. The plug and play device according to claim 19, wherein when the authorization procedure passes, the second switch couples the main function device to the host so that the host controls the main function device.

21. The plug and play device according to claim 20, wherein when the authorization procedure passes, the first switch is off.

22. The plug and play device according to claim 19, wherein when the authorization procedure fails, the second switch remains disabled so as not to couple the main function device to the host.

23. A plug and play device for being coupled to a host in order to transfer data, the plug and play device comprising:

a selection device for selectively making connection to the host;

an access control device, coupled to the selection device wherein the selection device selects the access control device, the access control device is coupled to the host so as to execute an authorization procedure; and a main function device, coupled to the selection device;

wherein when the plug and play device is connected to a host, the selection device firstly selects the access control device to connect to the host and the plug and play device informs the host that the plug and play device includes only the access control device so as to execute the authorization procedure and to hide the main function device and make the host unable to access the main function device through the selection device;

wherein when the authorization procedure passes, the selection device selects the main function device to connect to the host so as to accept control of the main function device by the host; and wherein when the authorization procedure fails, the selection device does not connect the main function device to the host and the plug and play device does not inform the host that the plug and play device further includes the main function device so as to hide the main function device so that the host is unable to access the main function device.

24. The plug and play device according to claim 23, wherein the selection device is a hub.

25. The plug and play device according to claim 23, wherein the authorization procedure comprises identifying a user name.

26. The plug and play device according to claim 23, wherein the authorization procedure comprises identifying a password.

27. The plug and play device according to claim 23, wherein the plug and play device meets at least an interface specification.

28. The plug and play device according to claim 27, wherein the at least an interface specification includes at least one of a USB interface specification, a PCI interface specification, a PCMCIA interface specification, and a Compact Flash interface specification.

29. The plug and play device according to claim 23, wherein the host is a personal computer, a server, or a personal digital assistant.

* * * * *